(12) United States Patent
De Wijs et al.

(10) Patent No.: US 11,019,493 B2
(45) Date of Patent: May 25, 2021

(54) SYSTEM AND METHOD FOR USER AUTHORIZATION

(71) Applicant: ABB Schweiz AG, Baden (CH)

(72) Inventors: Bart De Wijs, Made (NL); Nandan Rao, Bangalore (IN)

(73) Assignee: ABB SCHWEIZ AG, Baden (CH)

(*) Notice: Subject to any disclaimer, the term of this patent is extended or adjusted under 35 U.S.C. 154(b) by 55 days.

(21) Appl. No.: 16/436,941

(22) Filed: Jun. 11, 2019

(65) Prior Publication Data

US 2019/0297085 A1   Sep. 26, 2019

Related U.S. Application Data

(63) Continuation of application No. PCT/EP2017/079324, filed on Nov. 15, 2017.

(30) Foreign Application Priority Data

Dec. 15, 2016   (IN) .............................. 201641042760

(51) Int. Cl.
  *H04W 12/08* (2021.01)
  *H04L 29/06* (2006.01)
  (Continued)

(52) U.S. Cl.
  CPC ........... *H04W 12/08* (2013.01); *H04L 63/102* (2013.01); *H04L 63/105* (2013.01);
  (Continued)

(58) Field of Classification Search
  CPC ......... H04W 12/08; H04W 4/70; H04W 4/02; H04L 63/102; H04L 63/105;
  (Continued)

(56) References Cited

U.S. PATENT DOCUMENTS

| 7,185,192 B1* | 2/2007 | Kahn | .................. G06F 21/6218 |
| | | | 707/999.003 |
| 2014/0277618 A1* | 9/2014 | Nixon | ..................... G05B 11/01 |
| | | | 700/83 |

(Continued)

FOREIGN PATENT DOCUMENTS

WO    WO 02080084 A2    10/2002

*Primary Examiner* — J. Brant Murphy
(74) *Attorney, Agent, or Firm* — Leydig, Voit & Mayer, Ltd.

(57) ABSTRACT

A computer system for authorizing a user to process data received from one or more devices includes: an interface component for receiving the data; an application component for receiving requests from the user, the requests including one or more requests to perform data processing operations on at least a subset of the data; a data storage and data access component for storing and access the data; one or more evaluation components for processing the data; and an authorization component for granting or denying to the user access to process at least a subset of the data, a grant or denial being based on user specific data stored in a user directory for a registered user. The user specific data includes data on a geographical location associated with the user and data on a type of a device to which type the user is authorized to get access.

4 Claims, 10 Drawing Sheets

(51) Int. Cl.
*H04W 4/70* (2018.01)
*H04W 4/02* (2018.01)
*H04L 29/08* (2006.01)

(52) U.S. Cl.
CPC ............ *H04L 63/107* (2013.01); *H04W 4/02* (2013.01); *H04W 4/70* (2018.02); *G06F 2221/2111* (2013.01); *G06F 2221/2141* (2013.01); *H04L 67/306* (2013.01)

(58) Field of Classification Search
CPC ................ H04L 63/107; H04L 67/306; G06F 2221/2141; G06F 2221/2111
See application file for complete search history.

(56) References Cited

U.S. PATENT DOCUMENTS

| | | | | |
|---|---|---|---|---|
| 2015/0065172 A1* | 3/2015 | Do | ........................... | G06F 21/10 455/456.3 |
| 2015/0347784 A1* | 12/2015 | Keen | ................... | G06F 19/3481 726/28 |
| 2016/0149917 A1* | 5/2016 | Matthieu | ............... | H04L 63/102 726/4 |
| 2017/0076306 A1* | 3/2017 | Snider | ................ | G06Q 30/0205 |

\* cited by examiner

\<organization name>.\<level 1>.\<level 2>.\<level 3>.....\<level n>

FIG. 4

XYZCOMP (XYZCOMP.*)

EU (XYZCOMP.Region.*)

Country1 (XYZCOMP.Region.Country1.*)

City1 (XYZCOMP.Region.Country1.City1.*)

Plant (XYZCOMP.Region.Country1.City1.Plant.*)

*IED (XYZCOMP.Region.Country1.City1.Plant.IED.\*)*

ID34056
              (XYZCOMP.Region.Country1.City1.Plant.IED.ID34056)

ID56734
              (XYZCOMP.Region.Country1.City1.Plant.IED.ID56734)

ID32578
              (XYZCOMP.Region.Country1.City1.Plant.IED.ID32578)

*RTU (XYZCOMP.Region.Country1.City1.Plant.RTU.\*)*

City2 (XYZCOMP.Region.Country1.City2.*)

APAC (XYZCOMP.APAC.*)

Country2 (XYZCOMP.APAC.Country2.*)

Plant1 (XYZCOMP.APAC.Country2.Plant1.*)

Drives (XYZCOMP.APAC.Country2.Plant1.Drives.*)

Motors (XYZCOMP.APAC.Country2.Plant1.Motors.*)

Robots (XYZCOMP.APAC.Country2.Plant1.Robots.*)

Motors (XYZCOMP.APAC.Country2.Motors.*)

IoT_Gateway (XYZCOMP.APAC.Country2.IoT_Gateway.*)

SYSTEM AND METHOD FOR USER AUTHORIZATION

CROSS-REFERENCE TO PRIOR APPLICATION

This application is a continuation of International Patent Application No. PCT/EP2017/079324, filed on Nov. 15, 2017, which claims priority to Indian Patent Application No. IN 201641042760, filed on Dec. 15, 2016. The entire disclosure of both applications is hereby incorporated by reference herein.

FIELD

The present invention generally relates to electronic data processing, and more particularly, relates to computer systems and methods for user authorization. A particular area of use is the Internet of Things (IoT) and, more particular, the Industrial Internet of Things (IIoT).

BACKGROUND

The IoT is the internetworking of physical devices, e.g. vehicles (also referred to as "connected devices" and "smart devices"), buildings and other items, embedded with electronics, software, sensors, actuators, and network connectivity that enable these objects to collect and exchange data. The IoT allows objects to be sensed and/or controlled remotely across existing network infrastructure (see https://en.wikipedia.org/wiki/Internet_of things). The industrial Internet of Things (IIoT) is the use of the IoT technologies in manufacturing. It incorporates machine learning and big data technology, harnessing the sensor data, machine-to-machine communication and automation technologies that have existed in industrial settings for years. This data can enable organizations like companies to pick up on inefficiencies and problems sooner, saving time and money and supporting business intelligence efforts. In manufacturing specifically, IIoT holds great potential for quality control, sustainable and green practices, supply chain traceability and overall supply chain deficiency. IIoT also provides mechanisms to connect industrial devices to a cloud computing platform and to transfer information to the cloud platform for performing various operations such as analytics or data mining on the industrial data. It is apparent from the above that a huge amount of data is or will be collected in the IIoT area and it is also apparent that not every user of the system needs to see or shall be allowed to see each and every data in the system. Since a cloud computing platform by its nature includes data from a large user base, presence of right access controls is vital to the protection of sensitive industrial data. Further, since a cloud computing platform is envisaged as a central repository of data potentially belonging to different stakeholders with different requirements on controlling the access, the ability of providing controlled access to data collected through the entire life time of systems and devices is an important requirement within IIoT.

Role Based Access Control (RBAC) is a mechanism provided by the cloud computing platforms today to address these needs. RBAC attempts to provide granular access controls based on the associated roles of the users. However, the RBAC approach is not enough for finer access control requirements that an IIoT system requires. For example, a user with an assigned role needs to be permitted to view data related to devices only in a certain geographical location and information related to devices in another location needs to be hidden from the same user.

A way of achieving fine grained access control along with the notion of a location or equipment using RBAC approach would result in exponential increase in the number of "roles" and potentially leads to duplication, maintenance problems and erroneous situations failing to protect information in certain situations. Thus, there is a need for a method and/or processing system providing a more efficient user authorization with higher granularity.

SUMMARY

In an embodiment, the present invention provides a computer system for authorizing a user to process data received from one or more devices, comprising: an interface component configured to receive the data; an application component configured to receive requests from the user, the requests comprising one or more requests to perform data processing operations on at least a subset of the data; a data storage and data access component configured to store and access the data; one or more evaluation components configured to process the data; and an authorization component configured to grant or deny to the user access to process at least a subset of the data, a grant or denial being based on user specific data stored in a user directory for a registered user, wherein the user specific data comprise data on a geographical location associated with the user and data on a type of a device to which type the user is authorized to get access.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

This problem is addressed by computer systems, methods and computer program products describing different aspects of the present invention as described herein. A first aspect of the invention is described as a computer system for authorizing a user to process data received from one or more devices. Such computer system may be a stand-alone computing device (e.g., a single PC) as well as a network or Internet-based system of connected computers that provides shared computer processing resources on demand or as an on premise installation. Users can connect to such system via a client application, for example a browser, on a client computer. The client application may alternatively also be provided by the system itself. The computer system has an interface component configured to receive data from one or more devices. Such a device can be, for example, any manufactured product that can connect to a network, for example an intranet or the Internet, and thus can connect to the computer system. The system is provided with an application component configured to receive requests from the user. These requests comprise requests to perform data processing operations on at least a subset of said data. The computer system is provided with a data storage and access component. This component runs on the system and is configured to store and access the data collected from the one or more devices. The system is further provided with one or more evaluation components executable by the system and configured to process said data or any subset thereof. These evaluation components may, for example, provide data analysis capabilities for the user via the application component. This system is further provided with an authorization component configured to provide to the application component authorization information for granting or denying a user access to process at least a subset of said data, said grant or denial being based on user specific data stored in a user directory for a registered user. Grant or denial may be sent to the user via the application component. The user directory may comprise a record for each registered user. Such user record typically contains as user specific information user credentials (name, password etc.), contact information or other relevant user information.

In order to address the aforementioned technical problem, the user-specific data within the scope of this invention comprise data on a geographical location that is associated with the user and data on the type of a device to which data the user is authorized to get access. The geographical location associated with the user may be a location, for which the user has a responsibility within an organization, for example within a company. Said geographical location is not necessarily the location where the user or the organisation resides, but it can be. The term location may refer to a region like Europe, a country, a city, or any other arbitrarily defined smaller or larger region (e.g., a plant building). These user-specific data may be implemented as a part of the user record but may also be stored separately from the user record but still associated with the user.

The authorization component may, for example, be implemented as a RBAC system. Interface component, data storage and access component, evaluation components and authorization component may alternatively also be implemented in whole or in part, as the case may be, as sub components of the application component itself.

A second aspect of the invention is described as a computer implemented method of granting or denying to a client computer, operated by a user, access to process data on a computer system, said data being collected from a plurality of devices. The method can be executed by a computer system as described above: an application running on such computer system receives a request to process said data collected from the plurality of devices. The request is sent by the client computer program running on a client computer operated by the user. The client computer program, e.g. a browser, can also run on the computer system itself. Within the scope of this invention and for simplicity, both alternatives are in the following collectively referred to as "client computer". The application retrieves user-specific data from a user directory. The application then checks, whether said user-specific data match with device specific data and, based on the result of the matching, the application grants or denies to the client computer, i.e. to the user, access to the requested data processing.

A third aspect of the invention is described as a computer implemented method of granting or denying to a client computer operated by a user access to process data on a computer system, said data being collected from a plurality of devices. The method can also be executed by the computer system as described above: an application running on the computer system receives a request to process said collected data. This request is sent by the client computer. The application retrieves data on a geographical location associated with the user and the type of device associated with the user from a user directory. This retrieval can for instance be implemented via the authorization service or by the application directly accessing the user directory. The application retrieves data on the geographical location of the device or the plurality of devices and the type of the device or the plurality of devices the data from which are requested to be processed. Such device specific data can for example be transferred to the computer system when collecting data from the plurality of devices. The retrieval of these device specific data can for example be implemented via a platform service, which is configured to have direct or indirect (via other services) access to the data storage. The application then checks, whether said geographical location of the device and the type of the device match with one or more data on geographical locations and types of device associated with the user in the user directory, and, based on the result of the matching, grants or denies access to the client computer/user to the requested data processing.

A fourth aspect of the invention is described as a computer program product that, when loaded into a memory of a computing device and executed by at least one processor of the computing device, lets the computing device perform as a system, and/or enables the computing device to perform a method.

Advantageous embodiments of the aforementioned aspects are described in the following sections:

A first advantageous embodiment of the invention is characterized in that said user specific data comprise data about one or more roles the user holds within an organization. The term role describes a set of tasks a user has to do as a member of the organization. It is a common term in the context of RBAC. The mapping of roles to data processing operations allowed for a specific role, may be implemented, for example, by a table in the user directory. In case one or more roles are also assigned to device specific data, i.e. to a device and/or to a type of a device, the application can also check, whether role entries in the user-specific data match with role entries in the device specific data and thus can confine authorization on a further level.

A second advantageous embodiment of the invention is characterized in that the user specific data on the geographical location and the type of the device are coupled to form a first data object. Such first data object is hereinafter alternatively referred to as area of responsibility object (AoR).

A third advantageous embodiment of the invention is characterized in that the first data object and the data on the one or more roles are coupled to form a second data object. Such second data object is herein alternatively referred to as authorization information object or authorization object.

A further advantageous embodiment of the invention is characterized in that a plurality of second data objects are present for a registered user.

A further advantageous embodiment of the invention is characterized in that the plurality of second data objects to form a third data object, which is associated with one registered user. Such third data object is hereinafter alternatively referred to as authorization package.

A still further advantageous embodiment of the invention is characterized in that grant or denial of access is further based on device specific data associated with the data requested to be processed. Such device specific data may comprise data on the geographical location of the device and the type of the device. Such data on geographical locations can be of the same type as described above for the user specific data. The same is true for the type of device data.

A still further advantageous embodiment of the invention is characterized in that the device specific data further comprise time data related to the device. These time data specify the time during which the device resides or has resided in a specific geographical location. The time data may comprise a start date and a start time and an end date and an end time, defining a time period. Such time data may be available for every geographical location where the device resides or has resided. The respective time periods are not allowed to overlap for locations on the same level, for example locations of the city type. They may overlap for locations on different levels, for example for countries and cities of the respective country. Device specific time data reflect the location history of a particular device. In other words, data about or generated by the particular device at a particular location are associated with a time interval which specifies the time during which the particular device was operated at the particular location. That is, the time data allows for distinguishing data associated with the particular device with regards to various locations based on the time stamps of the respective data.

A still further advantageous embodiment of the invention is characterized in that the device specific data on the geographical location and the type of the device are coupled to form a fourth data object.

A still further advantageous embodiment of the invention is characterized in that a fourth data object and one or more time data are coupled to form a fifth data object. The one or more time data account for the situation, where a certain device resided on the same location at different times. Such a fifth data object is hereinafter alternatively referred to as location information object.

In a still further advantageous embodiment of the invention, a plurality of location information objects are coupled to form a sixth data object, which is associated with one device. Such sixth data object is hereinafter alternatively referred to as location package object or location package.

Such coupling allows for easy querying or matching processes and may be implemented by structures, classes or other known containers.

In a still further advantageous embodiment of the invention access to the requested data processing is granted or, alternatively, is only granted when, in case the requested data to be processed have one or more time values associated, the associated one or more time values match with the time data related to the device. For example: if the request for data processing contains a query for a specific device in a specific location in a specific year, access is granted, or only granted, if the specific device recited in the specific location in the specific year.

A still further advantageous embodiment of the invention is characterized in that the application retrieves data on one or more roles associated with the user from a user directory. Further, the application retrieves data on one or more roles associated with the requested data processing and, before granting access to the requested data processing, the application checks whether the data on the one or more roles associated with the user match with the data on the one or more roles associated with the requested data processing.

In a still further advantageous embodiment of the invention, the application queries a third data object (authorization package) and retrieves authorization information from one or more of the second data objects contained in the third data object. The application then checks, whether the data on the geographical location and the type of the device of the plurality of devices associated with the requested data processing match with the retrieved authorization information. Based on the result of the matching, access to the requested data processing is granted or denied.

In other words, the invention is characterized in that the application, in order to check whether the geographical location and the type of device match with one or more data on geographical location and type of device associated with the user, queries a third data object (authorization package) and checks whether the data on the geographical location and the type of the device of the plurality of devices associated with the requested data processing match with the data in one or more of the second data objects (authorization information) contained in the third data object.

In a still further advantageous embodiment of the invention the application may additionally check whether one or more roles associated with the requested data processing match with the data in one or more of the second data objects contained in the third data object.

In a still further advantageous embodiment of the invention, the application, in case the requested data to be processed have one or more time values associated, further identifies time data related to the plurality of devices. The application then grants the client computer access, if the associated one or more time values match with the time data related to the device.

In a still further advantageous embodiment of the invention, device specific data comprising location data, type data and time data are retrieved from a location package object associated with the respective device.

The different aspects of the invention and the advantageous embodiments allow fine grained access controls to information in computer systems, particularly in cloud based IIoT systems. The authorization component is introduced as a component in the computer system that works together with the application, APIs, user directory and other services in the computer system to provide services on authorization based on a combination of roles and AoR. The authorization component manages the authorization package and helps to abstract the concept of authorization from different parts of the computer system. The proposed systems and methods are less cumbersome and less error-prone and require less memory space when compared to the RBAC approach, since the number of roles in RBAC systems would explode and would become unmanageable. More importantly, systems and methods according to the invention reduce the probability that access is unintentionally granted to areas where it should not be granted, thereby also reducing the probability of leakage of information or other types of incidents. The invention also assists in auditing and failure analysis as more relevant information about the associated areas and access would be available, when an application or a service stores access or authorization data in a log file.

Figure 1:
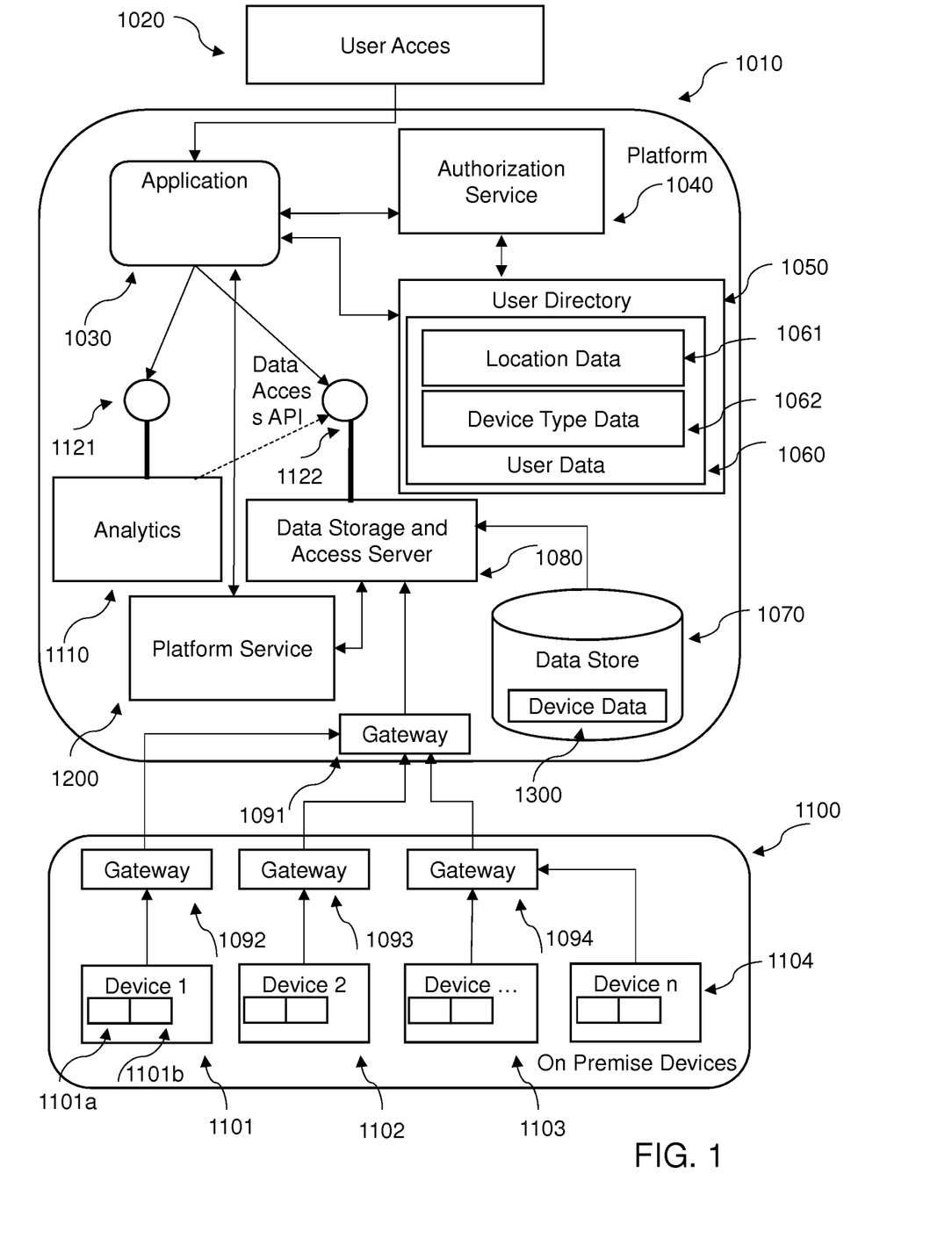
FIG. 1 is a simplified computer system according to an embodiment of the invention.

FIG. 1 is an example of a simplified computer system 1010 according to an embodiment of the invention. The computer system 1010 is operated by a user through a client computer 1020. System 1010 denotes a simplified view of an IIoT network architecture, useful for the purposes of this invention. It is not intended to be a full-scale representation of an IIoT architecture. An IIoT system may connect to on premise devices (or vice versa), that belong to an industrial system domain. These devices may produce information useful for the IIoT system. In the example, an industrial domain 1100 comprises a plurality of n devices denoted 1101 two 1104.

These devices connect to a gateway 1091 of system 1010 via gateways 1092 to 1094 and send information, for example 1101a and 1101b, respectively, to a data storage and access server 1080 of system 1010. This information may inter alia comprise information on the geographical location and on the type of the device. They are stored as device data 1300 in the data store 1070 of system 1010. System 1010 includes an analytics component 1110, which is configured to provide data analysis capabilities. The analytics component 1110 has access to the device data 1300 by means of a data access API 1122, which is part of the data storage and access server 1080. System 1010 further includes an application component 1030, which is configured to interact with client computer 1020 and provides data processing services for client computer 1020. Application 1030 is configured to interact with analytics component 1110 and data storage and access server 1080 via APIs 1121 and 1122. Application 1030 provides means to interpret, analyze and make decisions on the data collected. This data may be sensitive as it can influence business decisions and the access to the information needs to be strictly controlled in the fine grained fashion, if the sensitivity of the data requires to do so. Typically, there is a vast number of users and corresponding client computers 1020. However, not every user can be allowed to access all parts of the available data. To address this problem, a user directory 1050 provides means to store user-specific data 1060, which comprise data on the geographical location of the user 1061 and data on the type of the device 1062 to which data the user can get access. System 1010 further includes an authorization service 1040, configured to provide to application 1030 information on the user-specific data 1060 in the user directory 1050. Authorization service 1040 is further configured to provide information on roles and permissions applicable to the roles of the user. Using this information, application 1030 can grant or deny to a client computer 1020 access to the requested data processing operations. In case of grant, application 1030 can request a platform service 1200 to perform data processing operations based on the user-specific data 1060.

Device specific data may also be retrieved by the platform service 1200. Authorization service 1040 can be a separate service as shown in the figure, but can also be a module built in the application 1030. "Get/has access to" in this context means that a user is granted access to all (requested) data processing operation related to the device data.

Figure 2:
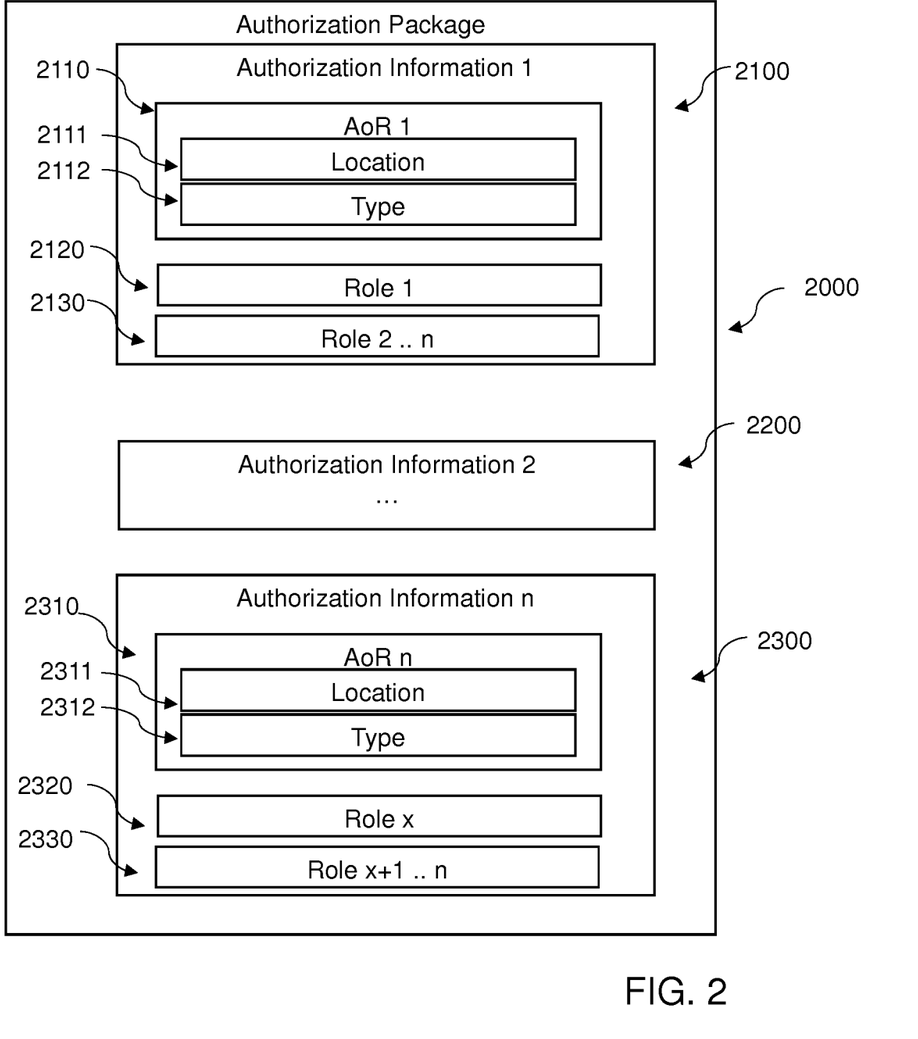
FIG. 2 is a simplified authorization package according to an embodiment of the invention.

FIG. 2 shows as an exemplary embodiment of the invention a third data object, an authorization package 2000, for storing user-specific information in the user directory 1050. Authorization package 2000 contains one to n authorization information objects 2100, 2200, 2300, each of which contains a first data object 2110, 2210, 2310, defining area of responsibility (AoR), and 1 to n data objects 2120, 2130 describing roles the user holds within an organization or that is associated with the user. The AoRs contain data objects on the geographical location of the user 2111 and on the type of device 2112 for which the user may get access. The authorization package 2000 is a container, for example implemented in XML. Containers of other programming languages (e.g. C++) may be used alternatively. Each authorization information object shall be unique within a container and there shall be at least one authorization information object in one authorization package. Each user may have one authorization package 2000 associated. Authorization package 2000 may be stored in a transparent attribute in the user record for every user. An example is given in FIG. 3.

Figure 3:
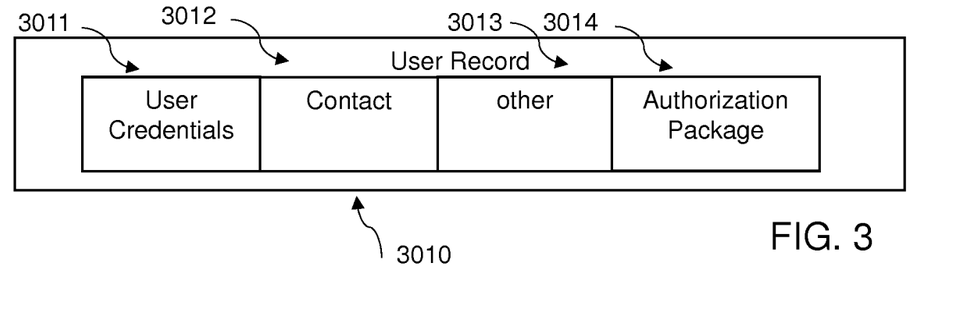
FIG. 3 is a simplified user record according to an embodiment of the invention.

FIG. 3 shows an exemplary structure of a user record 3010 according to the invention. User record 3010 comprises user credentials 3011 (e.g. name, password), contact information 3012 (e.g. address and the like), other information 3013 and an authorization package 3014.

Figure 4:
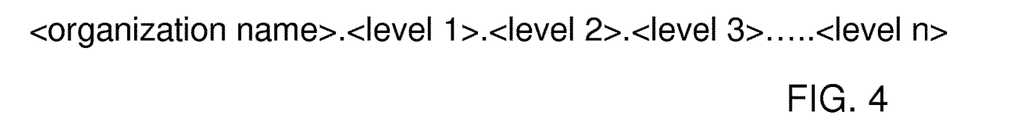
FIG. 4 is a simplified schema for defining an AoR according to an embodiment of the invention.
Figure 5:
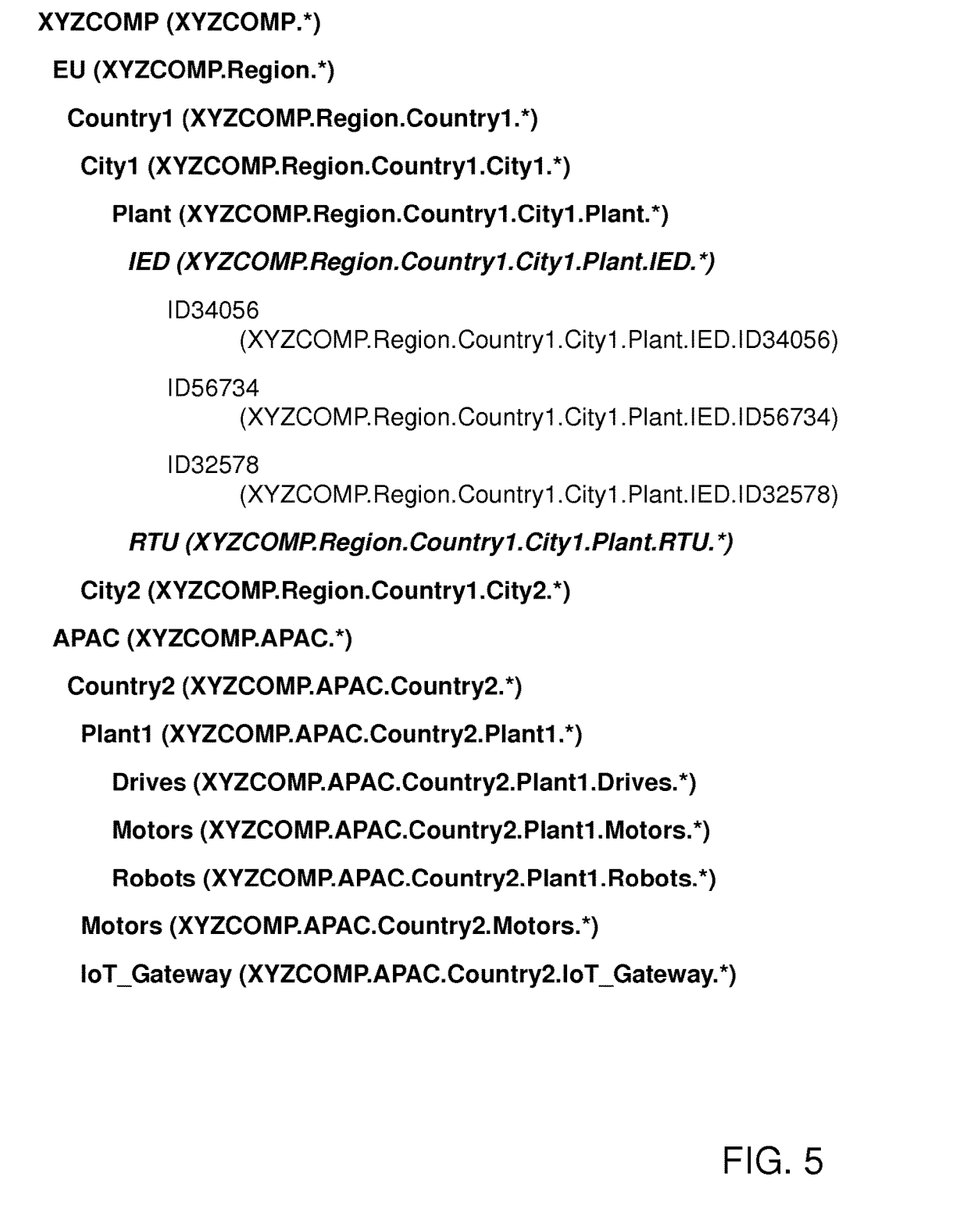
FIG. 5 is a simplified example of an AoR according to an embodiment of the invention.

FIGS. 4 and 5 give an example on how to define an area of responsibility (AoR). AoR may be defined using a name space starting with the organization's name as shown in FIG. 4. Organization name therein represents the name space for the AoR and the subsequent area levels represent the hierarchies applicable for the business operations of the organization. An example of an AoR definition using XML is given in FIG. 5. The example shows two cases of configuring AoR: location based and device type based. In case of location based configuration (XYZCOMP.Region.*), the AoR name space in the example contains hierarchies based on the country, a city plant and device level. If a user is assigned a role in XYZCOMP.EU.*, that user has the rights to access data operation processes for data related to devices located in all of the cities and plants in the XYZCOMP.EU hierarchy. In case of equipment type based configuration, (XYZCOMP.APAC.*), the AoR namespace contains hierarchies based on the equipment types belonging to an organization. For example, the namespace "XYZCOMP.APAC.Country2.Motors.*" allows usage access to all data operation processes relating to "Motor" equipment belonging to "XYZCOMP.APAC.Country2" namespace. Additionally, a combination of location and device type is possible as illustrated in "XYZCOMP.APAC.Country2.Plant1.Robots.*" namespace. This allows access rights to all data operation processes relating to "Robots" in a specific "Plant1" located in APAC/Country2 location. A "*" is used as a wildcard character to denote everything below the hierarchy in a namespace. For example, XYZCOMP.* denotes an AoR representing all countries, locations, plants, equipment types, etc. belonging to the "XYZCOMP" namespace. The AoR determines finer controls for access to the user. Together with an associated Role, the AoR determines to which part of the information the user has access to.

Figure 6:
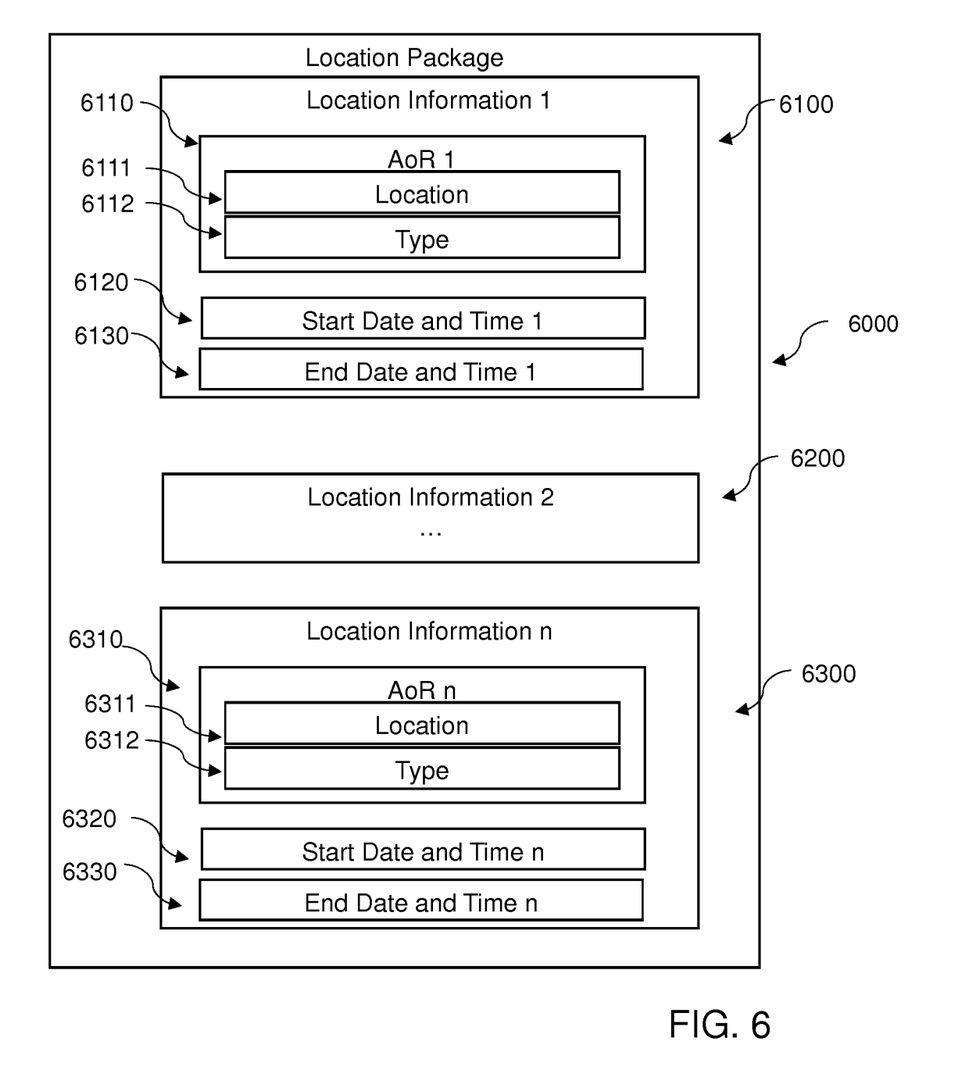
FIG. 6 is a simplified location package according to an embodiment of the invention.

FIG. 6 shows, as an exemplary embodiment of the invention, a sixth data object, a location package 6000 comprising device specific data. Location package 6000 contains one or more location information objects 1 to n, 6100, 6200, 6300. The location information objects contain, like in FIG. 2, AoR objects 6110, 6310. The AoR objects contain data objects 6111, 6311 on the geographical location, where the respective device resides, and data on the type of the device 6112, 6312. The one or more location information objects 6100, 6200, 6300 further comprise time data related to the device. The time data comprise a start date and time object 6120, 6320, respectively, and an end date and time object 6130, 6330, respectively. Both time data define a time period during which a device resides or has resided in a particular location. While a location package 6000 may have multiple location information objects having location and time information denoting a movement of the device over different geographical locations, there shall be no overlap in terms of time periods when the location information is different. This means, that the device cannot reside at different locations at the same time. In case an end date and time is not yet available, and date and time objects may be empty or open. A device may have one location package 6000 assigned. It may be stored in the meta data of the device, for example in device data 1300 in data store 1070. A platform service 1200 may be periodically updated or informed about the devices location information, including previous and current location, along with the time information and this information may be maintained in the computer system for use by the authorization service 1040 or the application 1030, as the case may be. The location package may also be implemented as a container, for example using XML. An application may deny access to operations if the combination of AoR and roles of the user in the authorization package do not match with the AoR of the device along with the duration information in the location package.

Figure 7:
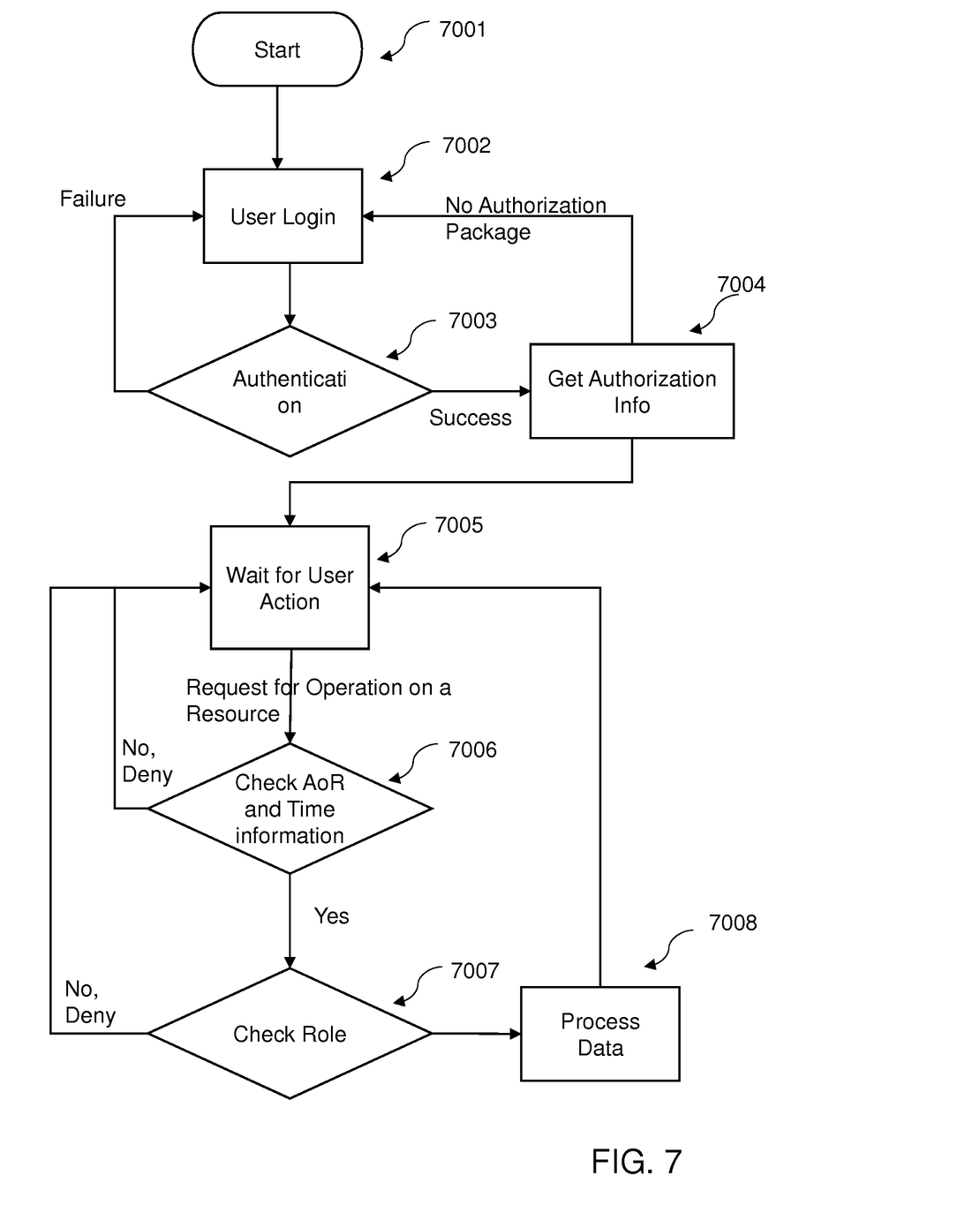
FIG. 7 is a simplified flowchart of an authorization process according to an embodiment of the invention.

FIG. 7 shows as an embodiment of the invention a simplified flowchart for performing authorization considering a combination of AoR and roles for user initiated actions. After a starting step 7001 there is a conventional user login 7002 to an application in a computer system followed by a conventional authentication 7003.

In case of success, the application checks in step 7004, whether an authorization package according to the invention is available and, if yes, retrieves AoR and the role information associated with the AoR in the authorization information object and then waits for a user action in step 7005. If the user requests for a data processing operation 7008 (for example read data) on data related to one or more devices, the application retrieves in step 7006 the AoR associated with the or each device on which data the operation is requested and then checks, whether the same AoR is present in any of the authorization information objects of the authorization package of the user. In a further embodiment, the application additionally checks in step 7006, whether the time duration of requested data falls in the range of the time information associated with the AoR for the requested device. The application then checks in step 7007, whether the associated roles retrieved in step 7004 provide permissions to perform the requested operation. This information may be retrieved from a role description object available in the user directory. If this step succeeds, then the operation 7008 is allowed to be performed. Otherwise, operation 7008 is denied and a suitable error message is shown to the user.

In a further embodiment of this process, operation 7008 would be allowed to data corresponding to the time information associated with the AoR. If the operation 7008 is requested on data belonging to a different time period, then the operation is not be permitted.

Figure 8:
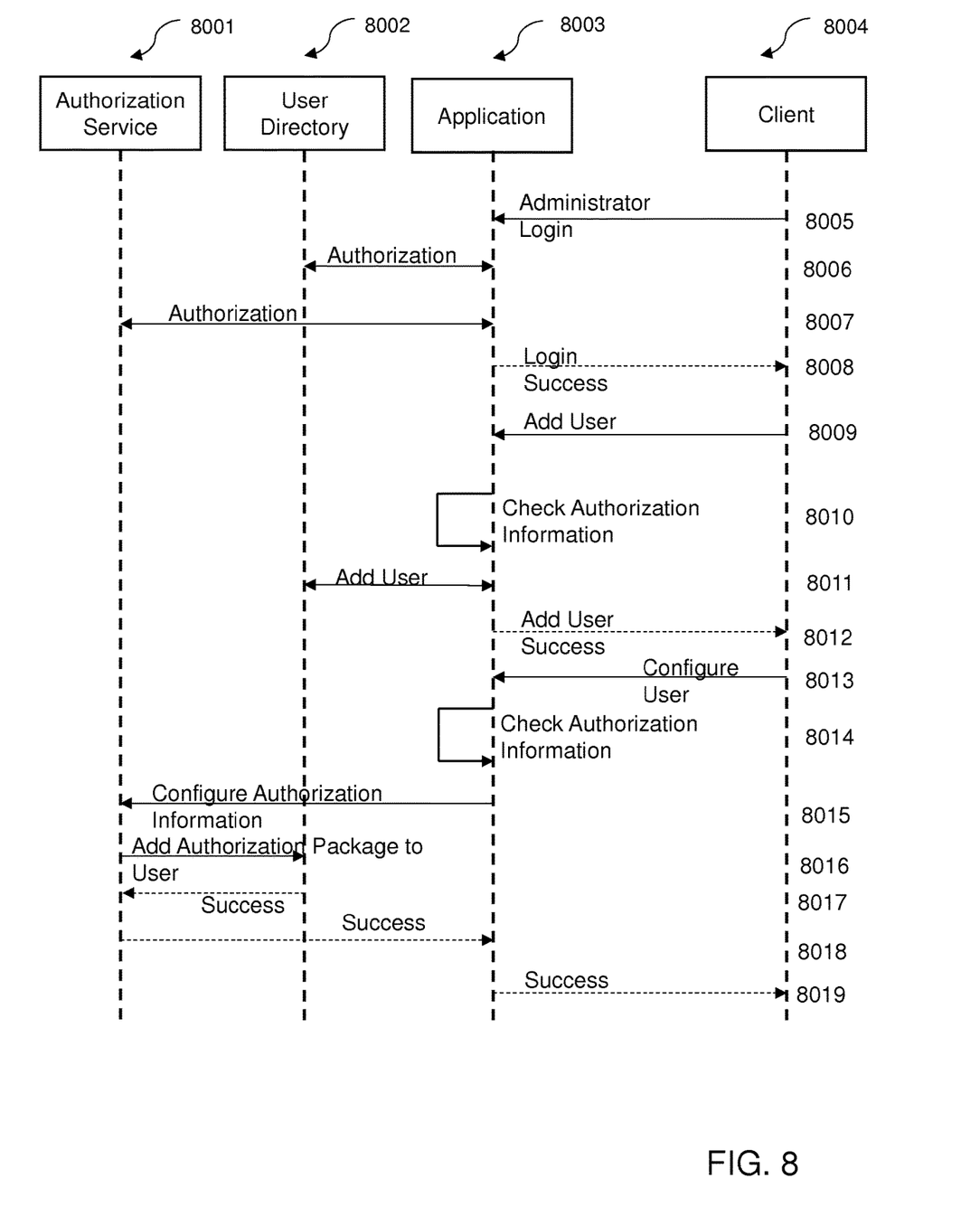
FIG. 8 is a simplified swim lane diagram for a process of adding an authorization package object to a computer system according to an embodiment of the invention.

FIG. 8 shows, as an embodiment of the invention, a simplified swim lane diagram describing a process of adding to a computer system a new user including an authorization package according to the invention. The computer system may be one as described in FIG. 1. It is provided at least with an authorization service 8001, a user directory 8002 and an application 8003. It is accessed by a client 8004. In this example the system is accessed by an administrator user via client 8004. The administrator user is configured with roles and AoR supporting administrative operations like the addition/deletion of users in the user directory 8002. The resource on which the operation is performed is the user directory, since a new user record and an authorization package is created and saved in the user record. In step 8005 the administrator user sends via client 8004 an administrator login request to application 8003. Application 8003 performs authentification of the user from the user directory 8002 in step 8006 and retrieves the authorization information for the user from the authorization service 8001 in step 8007. A login success message is provided to client 8004 in step 8008. Client 8004 sends new conventional user data like user credentials of the new user to application 8003 in step 8009. After checking the authorization information from step 8007 in step 8010 to ensure that the administrator user is authorized to add a new user to the user directory 8002, application 8003 adds a new user record to the user directory 8002 in step 8011. A success message is provided in step 8012. In step 8013 client 8004 sends AoR data and role data as further user-specific data of the new user, particularly as authorization information to application 8003. After a check of the authorization information in step 8014, application 8003 sends in step 8015 the authorization information to authorization service 8001, who configures an authorization package with this information and adds this new authorization package to the user record in user directory 8002 in step 8016. Success messages 8017, 8018, 8019 complete the process.

Figure 9:
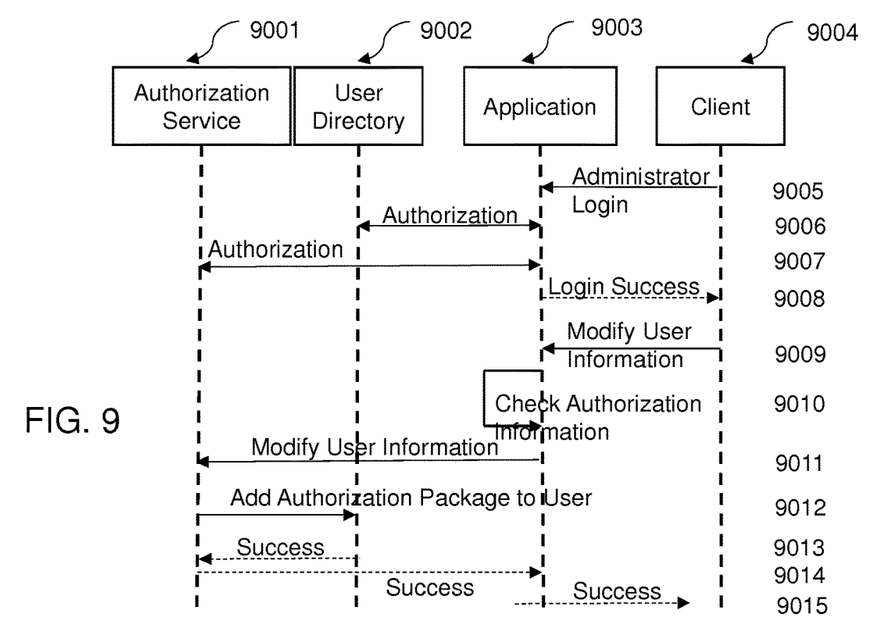
FIG. 9 is a simplified swim lane diagram for a process of modifying an authorization package object according to an embodiment of the invention.

FIG. 9 shows, as an embodiment of the invention, a simplified swim lane diagram describing a process of modifying an authorization package of a user. A computer system like the one as described in FIG. 1 is provided with at least and authorization service 9001, a user directory 9002 and an application 9003. The system is accessed by an administrator user via a client 9004 (compare FIG. 8).

Login steps 9005, 9006, 9007, and 9008 are identical to the login steps described in FIG. 8. After successful login client 9004 sends modification information to application 9003 in step 9009. Application 9003 checks in step 9010 whether the administrator user is authorized to modify a user information and, if so, sends in step 9011 the modification information to the authorization service 9001, which then adds the modified authorization package to the user directory 9002 in step 9012. Success messages 9013, 9014 and 9015 complete the process.

Figure 10:
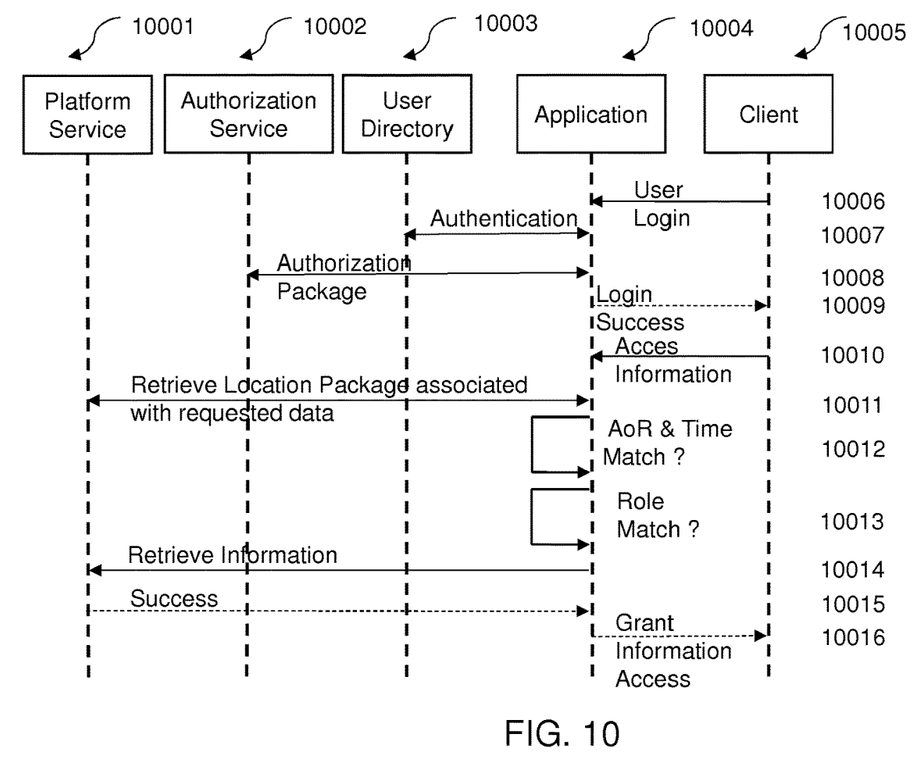
FIG. 10 is a simplified swim lane diagram for an authorization process to a computer system according to an embodiment of the invention.

FIG. 10 shows, as an embodiment of the invention, a simplified swim lane diagram describing a process of authentication and authorization for performing data processing operations on a computer system according to the invention. The computer system may be a one as described in FIG. 1. It is at least provided with a platform service 10001, an authorization service 10002, a user directory 10003 and an application 10004. It is accessed by a client computer 10005. As initial step 10006, a user performs a login to application 10004 via client computer 10005. After conventional authentication 10007 application 10004 requests authorization service 10002 to retrieve the authorization package for the requesting user in step 10008.

Figure 11:
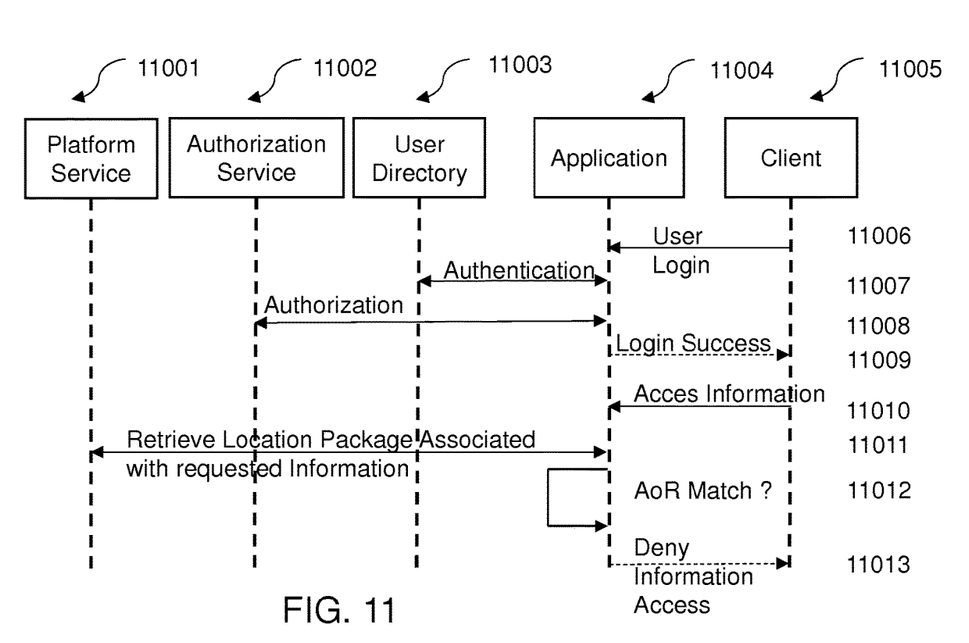
FIG. 11 is a simplified swim lane diagram of an authorization process, in which authorization fails.

Login success is provided in a step 10009. After successful login, in step 10010, the user sends information on the data he wants to access to application 10004, wherein the data include device information and time information, for example a device type and a specific year or a specific time period. Application 10004 then retrieves one or more location packages associated with the requested data to be accessed from platform service 10001 in step 10011. Application 10004 then checks in step 10012 whether the AoR data and the time data in the location packages match with the AoR data in the authorization package and the time data received in step 10010. If this check is successful, application 10004 checks in step 10013, whether the role data in the location package match with the role data in the authorization package. If this check is successful, application 10004 retrieves the requested information from the platform service 10001 in step 10014 and, after a success message 10015, grants the client 10005 access in step 10016. It is to be noted that the order in which the AoR matching checks and the role matching checks are performed is not relevant. FIG. 11 shows, as an embodiment of the invention, a simplified swim lane diagram describing a process of authentication and authorization for performing data processing operations on a computer system as already described in FIG. 10.

There is a platform service 11001, an authorization service 11002, a user directory 11003, an application 11004 and a client 11005. After login 11006, authentication 11007, authorization 11008 and success message 11009, the user provides the access information 11010 (see 10010 in FIG. 10). Such access 11010 information may comprise time data describing a time or a time period, to which the requested data should belong. For example: data for a specific device X in a certain year X (described in more detail in FIGS. 13 and 14). After retrieval of the one or more location packages (11011), Application 11004 then checks in step 11012 whether the AoR data and, if AoR data match, the time data in the location package of device X match with any of the AoR data in the authorization package of the user and the time data received in step 11010. Since the AoR data do not match in this example, application 11004 denies access to the information in step 11013 with no regard to time or role information.

Figure 12:
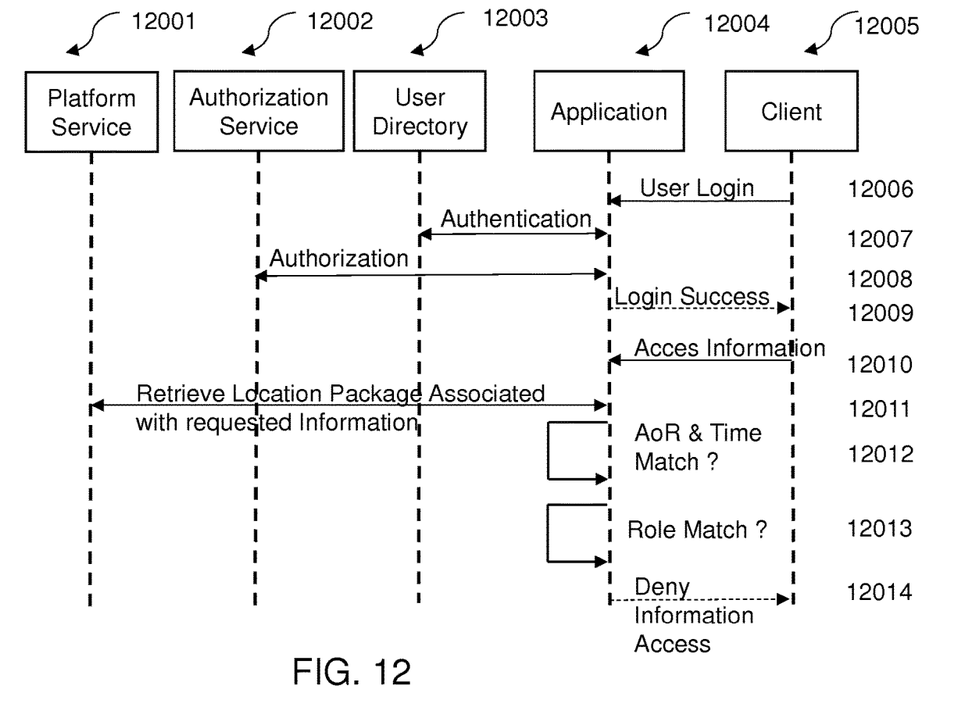
FIG. 12 is a simplified swim lane diagram of a second authorization process in which authorization fails.

FIG. 12 shows as an embodiment of the invention a simplified swim lane diagram describing the continuation of the process described in FIG. 11 in case matching step 11012 is successful. System and numbering is identical except that the numbering in FIG. 12 starts with 12001 instead of 11001. In this example, the roles of the associated user AoR do not grant permission to perform the requested operation on the information 12013. Thus, access is denied in step 12014.

Figure 13:
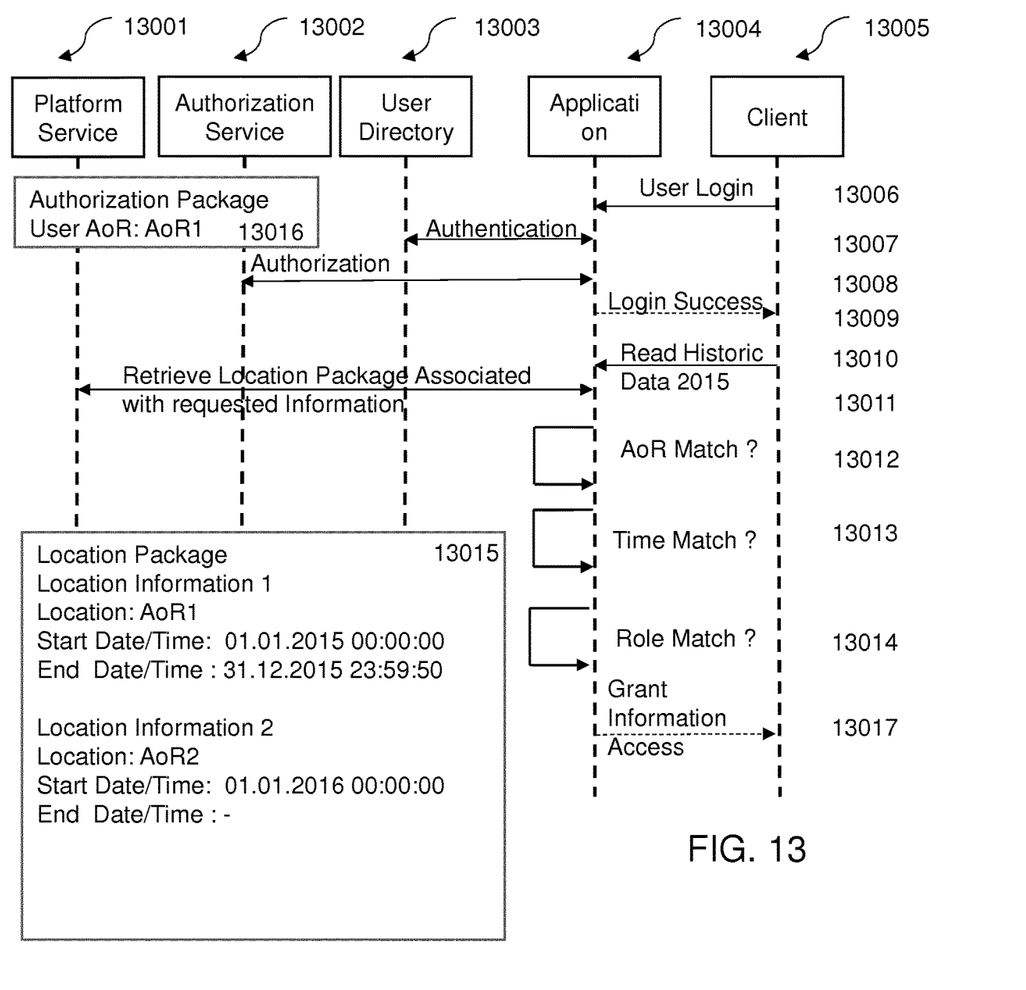
FIG. 13 is a simplified swim lane diagram of an authorization process including time information according to an embodiment of the invention.

FIG. 13 shows as an embodiment of the invention a simplified swim lane diagram describing a process of authentication and authorization for performing data processing operations on a computer system, wherein data processing is requested on historic data, e.g. from the year 2015. The components of the system are the same as already described in the previous figures: platform service 13001, and authorization service 13002, a user directory 13003, an application 13004 and a client 13005. Numbering starts with 13001 instead of 12001. After login 13006 and authentication 13007, application 13004 retrieves an authorization package 13016 via the authorization service 13002. Authorization package 13016 contains as user AoR AoR1. Then, the user requests to read historic data from the year 2015 in step 13010. Application 13004 then retrieves a location package 13015 associated with the requested historic data in step 13011. Application 13004 then checks in step 13012, whether any of the AoR data in the location package 13015 match with any of the AoR data in the authorization package 13016. Since both packages contain an AoR1, this matching is successful and the application can proceed to the time matching step 13013. Since the time period associated with AoR1 coincidences with the requested year 2015, this matching is successful, too. Thus, application 13004 checks in a subsequent step 2014, whether the roles of the associated user AoR do grant permission to perform the requested operation 13010, i.e. to access the requested data. If the operation is permitted, application 13004 grants access to the requested information in step 13017.

Figure 14:
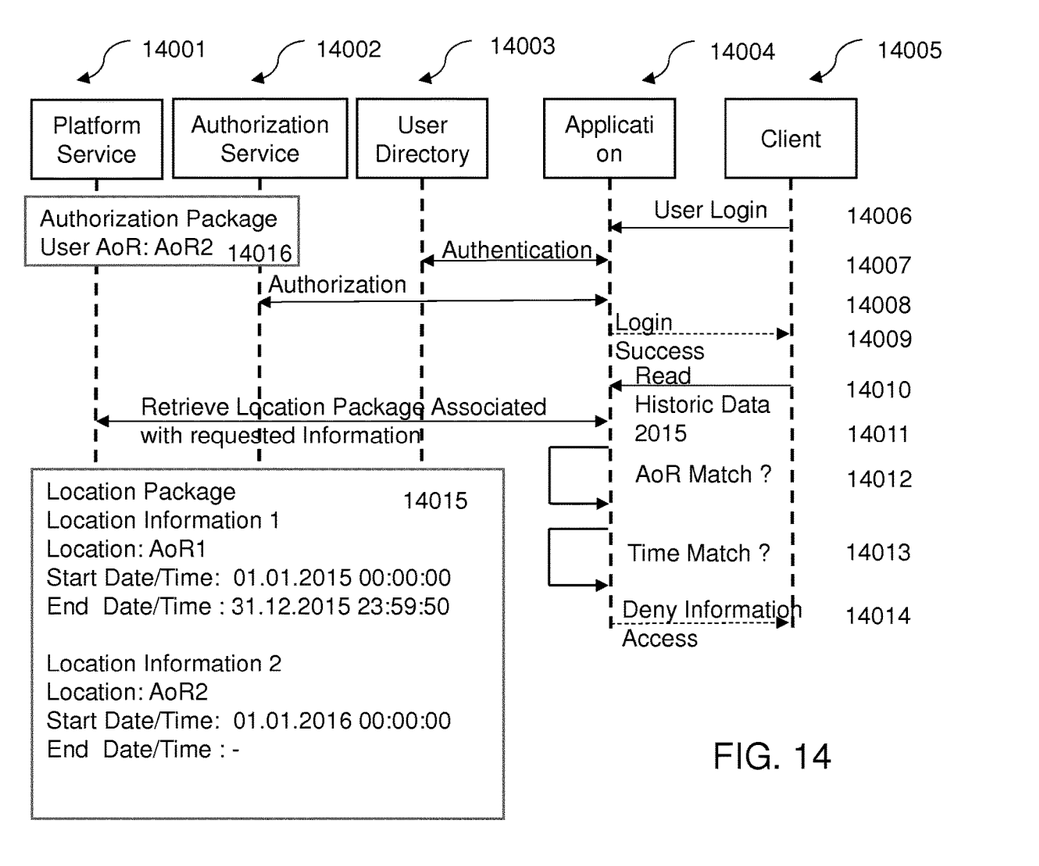
FIG. 14 is a simplified swim lane diagram of an authorization process including time information according to an embodiment of the invention in which authorization fails.

FIG. 14 shows as an embodiment of the invention a simplified swim lane diagram describing a process nearly identical to the process as described in FIG. 13. The difference is that the user has an AoR2 assigned in his authorization package 14016. The system is the same, however, numbering starts with 14001 instead of 13001.

Although AoR matching in step 14012 is successful, because location package 14015 comprises an AoR2 location, time matching in step 14013 fails, because the—open-time period in the location information 2 has a start date of Jan. 1, 2016, which is outside the requested year 2015. Therefore, access is denied in step 14014.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A computer implemented method of granting or denying to a client computer, operated by a user, access to process data on a computer system, the data being collected from a plurality of devices, the method comprising:
 a) an application receiving a request to process the data, the request being sent by the client computer;
 b) the application retrieving data on a geographical location associated with the user and a type of device associated with the user from a user directory;

c) the application retrieving data on the geographical location and the type of the device of the plurality of devices, the data from which are requested to be processed;
d) the application checking whether the geographical location and type of device match with one or more data on geographical location and the type of the device associated with the user in the user directory, and the application querying a data object, wherein the grant or denial is based on device specific data associated with the data requested to be processed, and checking whether the data on the geographical location and the type of the device of the plurality of devices and the data on one or more roles associated with the requested data processing match with the data in one or more further data objects contained in the data object; and
e) based on a result of the matching, granting or denying to the client computer access to the requested data processing.

2. The method of claim 1, further comprising:
the application retrieving data on one or more roles associated with the user from a user directory;
the application retrieving data on one or more roles associated with the requested data processing; and
before granting or denying access to the requested data processing, the application checking whether the data on the one or more roles match with the data on the one or more roles associated with the requested data processing.

3. The method of claim 1, further comprising:
in the requested data to be processed have one or more time values associated therewith, the application further identifying time data related to the plurality of devices, the time data specifying one or more time periods during which a device resides in the respective geographical location; and
the application granting access to the client computer if the associated one or more time values match with the time data related to the device.

4. A non-transitory computer-readable medium containing processor-executable instructions for granting or denying to a client computer, operated by a user, access to process data on a computer system, the data being collected from a plurality of devices, the processor-executable instructions, which, when executed by one or more processors, cause the one or more processors to:
a) receive a request to process the data, the request being sent by the client computer;
b) retrieve data on a geographical location associated with the user and a type of device associated with the user from a user directory;
c) retrieve data on the geographical location and the type of the device of the plurality of devices, the data from which are requested to be processed;
d) check whether the geographical location and type of device match with one or more data on geographical location and the type of the device associated with the user in the user directory, and query a data object, wherein the grant or denial is based on device specific data associated with the data requested to be processed, and check whether the data on the geographical location and the type of the device of the plurality of devices and the data on one or more roles associated with the requested data processing match with the data in one or more further data objects contained in the data object, all so as to perform a match check; and
e) grant or deny, based on a result of the match check, the client computer access to the requested data processing.

* * * * *